(12) United States Patent
Costanzo et al.

(10) Patent No.: US 8,365,902 B2
(45) Date of Patent: Feb. 5, 2013

(54) BELT CONVEYORS WITH RETRACTABLE WALL SEGMENTS

(75) Inventors: Mark Costanzo, River Ridge, LA (US); Eric M. Pressler, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 276 days.

(21) Appl. No.: 12/671,379

(22) PCT Filed: Aug. 22, 2008

(86) PCT No.: PCT/US2008/074053
§ 371 (c)(1), (2), (4) Date: Jan. 29, 2010

(87) PCT Pub. No.: WO2009/026533
PCT Pub. Date: Feb. 26, 2009

(65) Prior Publication Data
US 2010/0219048 A1 Sep. 2, 2010

Related U.S. Application Data

(60) Provisional application No. 60/957,306, filed on Aug. 22, 2007.

(51) Int. Cl.
*B65G 15/20* (2006.01)
*B65G 15/00* (2006.01)
*B65G 17/06* (2006.01)

(52) U.S. Cl. ........ 198/779; 198/853; 198/817; 198/851; 198/845

(58) Field of Classification Search ........................ None
See application file for complete search history.

(56) References Cited

U.S. PATENT DOCUMENTS

| | | | |
|---|---|---|---|
| 3,334,725 A | 8/1967 | Wardlaw et al. | |
| 4,793,261 A | 12/1988 | Schwaemmle | |
| 4,895,246 A * | 1/1990 | Rizzi | 198/463.4 |
| 5,038,921 A | 8/1991 | Hoppmann et al. | |
| 5,890,584 A * | 4/1999 | Bonnet | 198/867.15 |
| 5,950,933 A | 9/1999 | Balmer | |
| 6,244,429 B1 | 6/2001 | Drewitz et al. | |
| 6,318,544 B1 * | 11/2001 | O'Connor et al. | 198/853 |
| 6,390,285 B2 | 5/2002 | deGeus et al. | |
| 6,494,312 B2 | 12/2002 | Costanzo | |
| 6,705,452 B2 | 3/2004 | Greve et al. | |
| 6,811,021 B1 * | 11/2004 | Corley | 198/690.2 |
| 7,249,671 B2 * | 7/2007 | Riddick et al. | 198/457.05 |
| 7,255,227 B2 | 8/2007 | Melancon | |
| 7,311,192 B2 | 12/2007 | Fourney | |

* cited by examiner

*Primary Examiner* — Kavel Singh
(74) *Attorney, Agent, or Firm* — James T. Cronvich

(57) ABSTRACT

A conveyor having a conveyor belt with wall segments that pivot between a retracted position below the conveying surface of the belt and an extended position above the conveying surface. When extended, the wall segments form a wall along the length of a portion of the belt to prevent conveyed articles from moving laterally past. The retractable wall segments are cam- or spring-actuated. Diverting conveyors using the retractable wall segments in an oblique-roller conveyor belt are useful as sorters or switches.

21 Claims, 4 Drawing Sheets

BELT CONVEYORS WITH RETRACTABLE WALL SEGMENTS

BACKGROUND

The invention relates generally to power-driven conveyors and, more particularly, to conveyors using conveyor belts or chains with retractable wall segments.

Sideguards attached at the side of a conveyor belt confine conveyed articles on the belt's conveying surface by forming a barrier that prevents articles from falling off the side of the belt. In some applications, such as sorting, a belt, such as an oblique-roller belt having rollers arranged to rotate oblique to the direction of belt travel, pushes articles conveyed atop the belt rollers toward a side of the belt to transfer to other conveyors or sorting stations at transfer points along the length of the conveyor. Sideguards are not used on the transfer sides of sorting belts because they would interfere with the side-off transfer. Consequently, side rails on the conveyor frame are positioned along the side of the conveyor between transfer points to confine articles to the belt. In other applications, such as 1:2 switching, an oblique-roller belt's rollers are selectively activated to push articles to one side of the belt or the other against sideguards or side rails to form two lanes of articles. The side guards or side rails index the articles in each lane for end-off transfer to two parallel outfeed conveyors. But switches feeding more than two outfeed conveyors require the accurate formation of lanes of products within the interior of the conveyor away from the sideguards and side rails.

SUMMARY

These shortcomings and others are satisfied by a conveyor embodying features of the invention. In one aspect, the conveyor comprises a conveyor belt having an outer conveying surface between two sides that define the width of the belt. Retractable wall segments are positioned along at least one side of the conveyor belt at spaced locations. A pivot is arranged with each of the retractable wall segments. The pivot pivots the wall segment between a retracted position and an extended position. In the retracted position, the wall segment is at or below the level of the articles conveyed atop the conveying surface of the belt. In the extended position, the wall segment is above the conveying surface and forms a wall with the other extended wall segments to prevent articles conveyed on the belt from moving past. The conveyor also includes means for pivoting the retractable wall segment at the pivot.

In another aspect of the invention, a conveyor comprises a modular conveyor belt with retractable wall segments. The modular conveyor belt is constructed of one or more belt modules arranged side by side in a series of rows hingedly connected end to end to form an endless belt that can advance in a direction of belt travel. The rows extend in a lateral direction perpendicular to the direction of belt travel to opposite side edges that define the belt's width. The retractable wall segments are positioned along at least one of the side edges of the belt. The wall segments are movable from a retracted position at or below the level of articles conveyed on the belt to an extended position that provides a wall to prevent conveyed articles from moving laterally past the wall.

In yet another aspect of the invention, a modular conveyor belt comprises a series of rows, each made up of a single belt module or multiple belt modules arranged side by side. Consecutive rows of belt modules are hingedly connected end to end to form an endless modular conveyor belt that can be advanced in a direction of belt travel. The rows extend in a lateral direction perpendicular to the direction of belt travel to opposite side edges defining the belt's width. Rollers in the modules are arranged to rotate in a rolling direction not parallel to the direction of belt travel. Salient portions of the rollers protrude above the belt to push articles conveyed atop the rollers in the rolling direction toward a side edge of the belt. Retractable wall segments disposed in the modules in a line in the direction of belt travel move from a retracted position at or below the level of the conveyed articles to an extended position, in which the wall segments provide a wall that prevents articles pushed laterally from moving past.

Still another aspect of the invention provides a method for operating a conveyor. The method comprises: (a) pushing articles conveyed atop belt rollers in a conveyor belt toward a side edge of the belt as it advances in a direction of belt travel; (b) extending wall segments attached to the belt in a line to an extended position above the level of the rollers to form a wall preventing the articles from moving laterally past the wall; and (c) retracting the wall segments to a retracted position at or below the level of the articles atop the rollers to allow the articles to be moved by the rollers laterally past the retracted wall segments.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
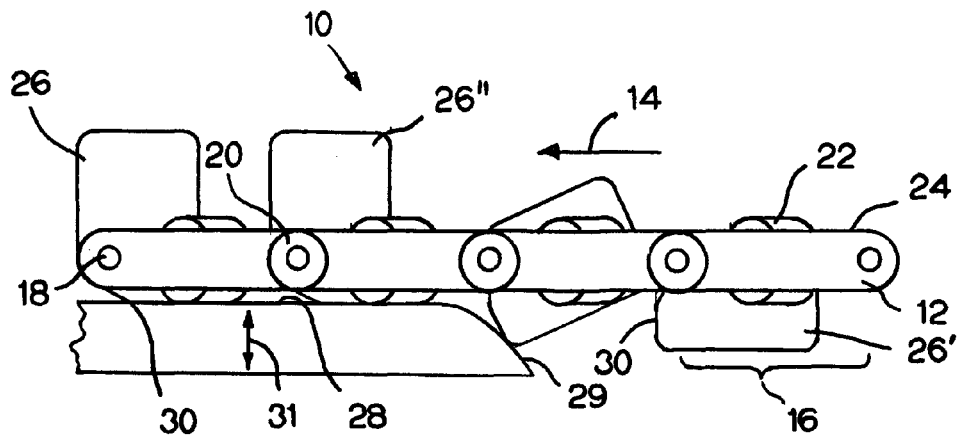
FIG. 1 is a side elevation view of a portion of one version of a conveyor embodying features of the invention including cam-actuated retractable wall segments.

One version of a belt conveyor embodying features of the invention is shown in FIG. 1. The conveyor 10 includes a conveyor belt 12 advancing in a direction of belt travel 14 along a carryway. The belt is constructed of rows 16 of one or more belt modules linked end to end by a hinge rod 18 received in a lateral passageway formed through aligned and interleaved hinge eyes 20 of adjacent interconnected rows. Rollers 22 extend through the thickness of the belt to support articles above the belt's outer conveying surface 24. Wall segments 26 are pivotally attached to lateral axles, such as the hinge rods, at a side edge of each row of modules. The wall segments are in the form of rectangular plates, each with a pivot hole at one of the corners. The weight of the wall segment causes it to rotate down to a normally retracted position 26' below the level of the conveying surface of the belt. A cam surface 28 with a tapered leading edge 29 is positioned below the belt in line with the wall segments along the side edge of the belt in a region in which it is desirable to have sideguards at the belt edge. The shorter edge 30 of the wall segment terminating at one end in the pivot hole acts as a cam follower that causes that wall segment to pivot from the retracted position 26' to an extended position 26" as it rides along the leading edge 29 of the cam surface 28. Thus, the placement of the cam surface defines a region of the conveying path along which the wall segments are extended to form a wall or sideguard to prevent conveyed articles from moving laterally beyond the edge of the belt. And, as indicated by arrow 31, the cam surface may be moved into and out of contact with the wall segments by conventional means; e.g., motors, pneumatics, hydraulics.

Figure 2:
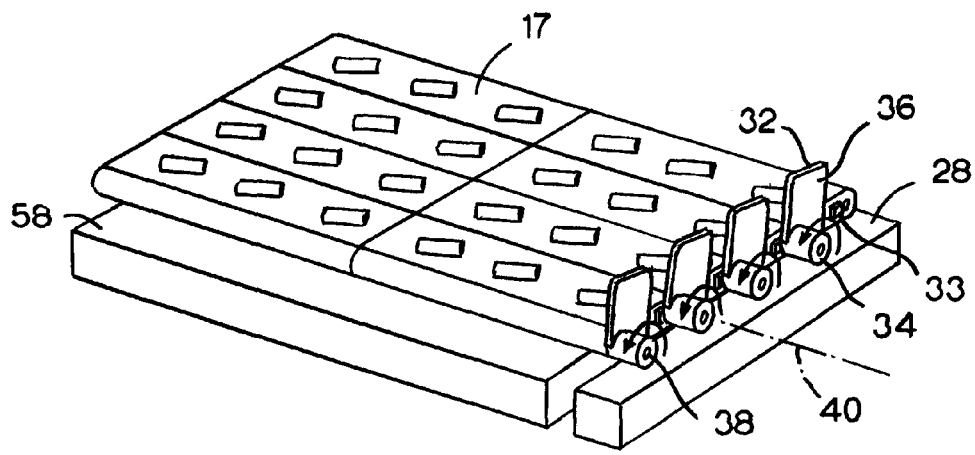
FIG. 2 is an isometric view of a portion of another version of a conveyor embodying features of the invention including cam-roller-actuated wall segments.

Another version of a conveyor with retractable wall segments is shown in FIG. 2. In this version, each wall segment 32 has an integral roller 34 protruding outward of a side 36 of the wall segment. A bore 38 through the roller receives the belt's hinge rod and defines a lateral pivot axis 40 on which the wall segment can rotate. As the wall segments' rollers, which act as cam followers, first engage the cam surface 28, they roll on the cam surface and rotate the wall segments to the upright extended position shown. Stops 33 in the belt edge structure prevent the wall segments from rotating past their upright position. Once the wall segments are in their upright position, the rollers slide along the cam surface without further rotation. At the downstream end of the cam surface, the wall segments are free to return to their retracted positions. Thus, the cam surfaces and the cam followers in FIGS. 1 and 2 constitute means for pivoting the wall segments between extended and retracted positions.

Figure 3:
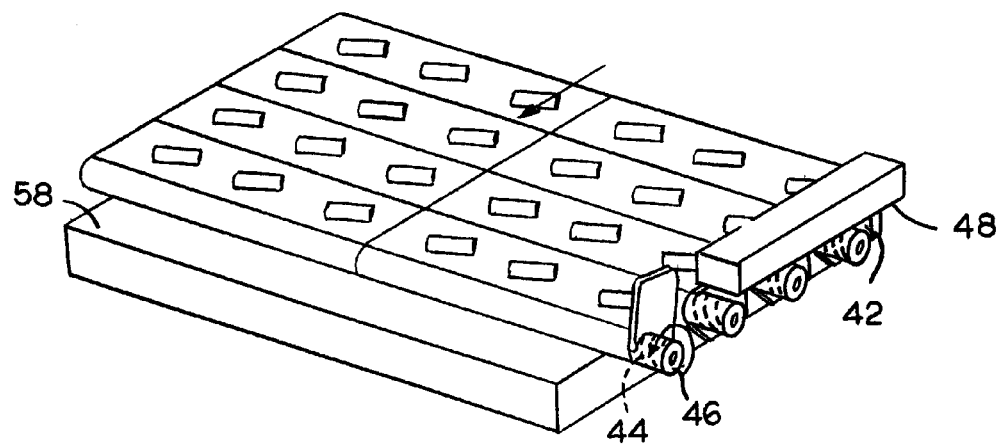
FIG. 3 is an isometric view of a portion of another version of a belt conveyor embodying features of the invention including spring-biased retractable wall segments and a blocking surface above the belt.

A different means for pivoting is shown in FIG. 3. In this example, each wall segment 42 is biased in an extended position by a spring 44 in the pivot 46. A blocking surface 48 extending along a portion of the conveyor above the level of the conveying surface blocks the wall segments from rotating to their normally extended position and keeps them in their retracted position.

Figure 4:
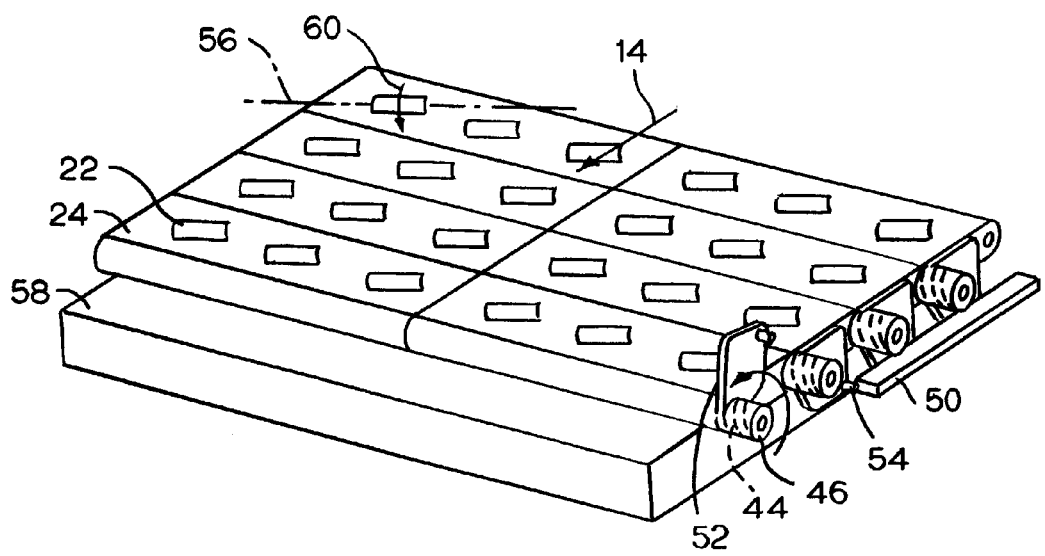
FIG. 4 is an isometric view of a portion of another version of a belt conveyor including spring-biased wall segments as in FIG. 3 and a blocking surface below the belt.

In the example of FIG. 4, a blocking surface 50 is positioned below the conveyor belt. The wall segments 52 in this version include dogs 54 extending laterally outward of the sides of the wall segments under the blocking surface. Thus, the blocking surface keeps the wall segments in their retracted position. As in FIG. 3, a spring in the pivot provides the means for pivoting.

Although the retractable wall segments could be used with a variety of belts, FIGS. 1-4 show a modular conveyor belt having belt rollers 22 arranged in belt modules 17 to rotate on axes 56 oblique to the direction of belt travel 14. Furthermore, the diameters of the belt rollers may exceed the thickness of the belt so that salient portions of the rollers protrude past the underside of the belt into contact with a supporting engagement surface 58 along the carryway. As the belt advances in the direction of belt travel, the belt rollers roll on the engagement surface and rotate in the direction of arrow 60. This direction of rotation pushes the articles conveyed atop the belt rollers toward the side of the belt. Thus, the belts shown are useful in diverting applications, such as sorters and switches.

Figure 5A:
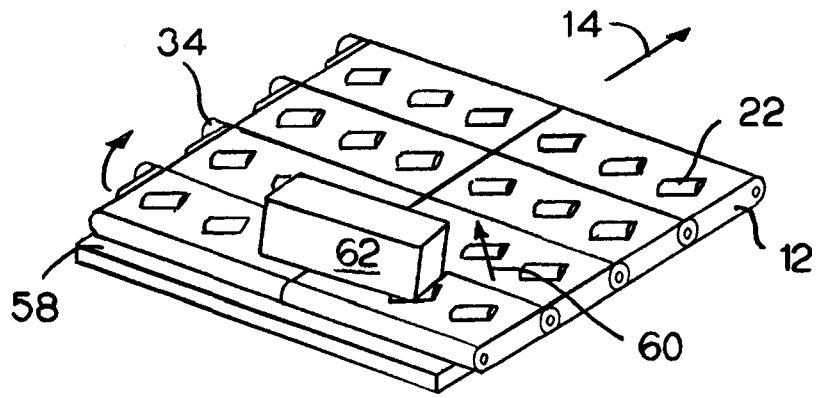
FIGS. 5A-5C are isometric views of a portion of a conveyor as in FIG. 2 showing the step-by-step operation of the conveyor.
Figure 5B:
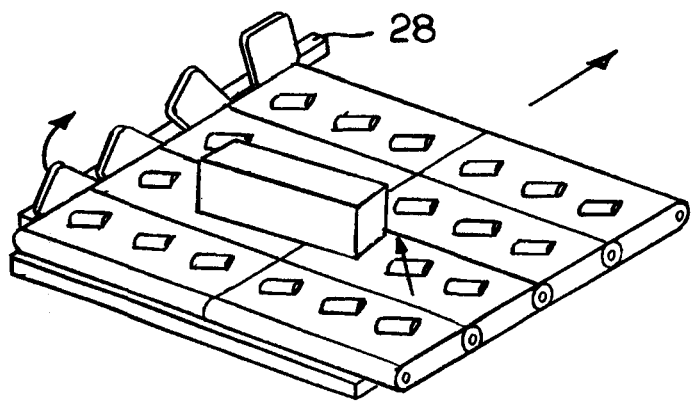
Figure 5C:
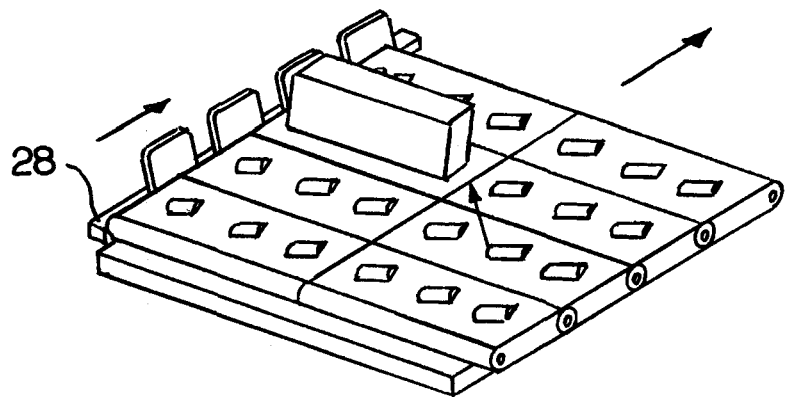

The operation of an oblique-roller belt 12 having wall segments 32 forming sideguards is illustrated in FIGS. 5A-5C. In FIG. 5A, an article 62 on this diverting conveyor rides atop the rollers, which roll on the engagement surface 58 as the belt advances in the direction of belt travel 14. The rollers push the article in the direction of arrow 60 toward a side edge of the belt. The belt is shown at a location along the conveyor farther downstream in FIG. 5B. A cam surface 28 located in that region of the conveyor causes the sideguards to rotate from their retracted positions to extended positions by contact with the cam roller 34 on each sideguard. Even farther downstream, as illustrated in FIG. 5C, the sideguards are all extended forming a wall along the side edge of the belt against which the article can be indexed for delivery to another conveyor or a processing station along the edge of the belt. If, farther downstream, the sideguards are retracted, the article can be pushed off the side of the belt by the oblique belt rollers in a sorting application, for example.

Figure 6A:
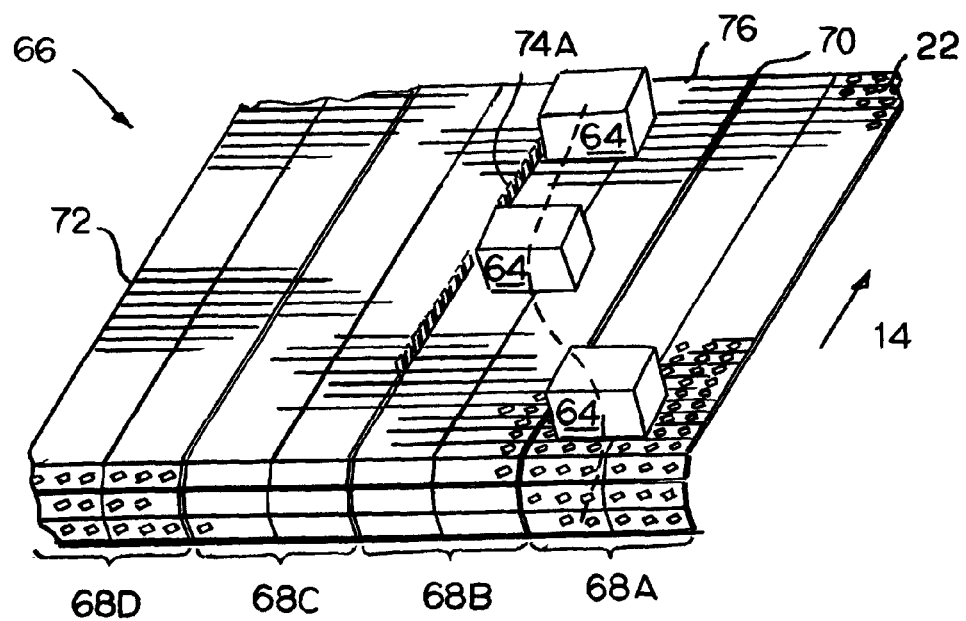
FIGS. 6A and 6B are pictorial views of a multi-lane conveyor switch using one or more conveyor belts as in any of FIGS. 1-4 showing its ability to lane conveyed articles.
Figure 6B:
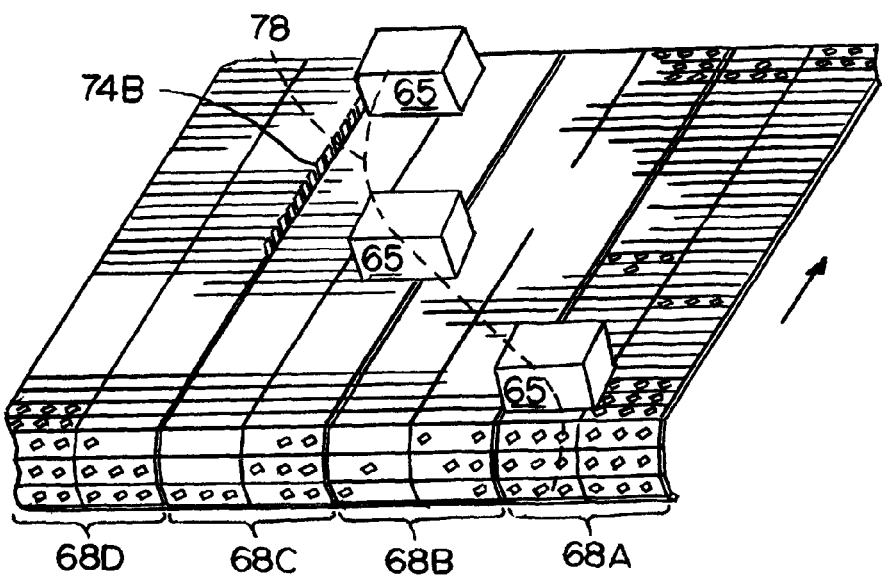

The operation of a switch conveyor using a belt conveyor embodying features of the invention is shown in FIGS. 6A and 6B. In FIG. 6A, first packages 64 are intended for delivery to an outfeed conveyor at a specific position across the width of a belt conveyor 66. The belt conveyor shown is made up of four modular conveyor belt strands 68A-D separated by narrow gaps 70. The packages are fed onto the switch conveyor on the right most belt strand 68A. As the belts advance in the direction of belt travel, the belt rollers 22 push the articles toward the left side 72 of the switch. Wall segments 74A in the gap between strand 68B and 68C are selectively extended to form a wall along the interior of the belt conveyor. The wall prevents the packages from moving laterally past and, so, forms a surface against which the packages are registered for delivery at the downstream end 76 to an outfeed conveyor aligned with strand 68B. The packages 65 destined for an outfeed conveyor aligned with strand 68C at the downstream end of the switch follow the path 78 shown in FIG. 6B. In this case, the wall segments between strands 68B and 68C are refracted below the belt to allow the packages to transit the switch from strand 68A, across strand 68B, to strand 68C. The wall segment 74B in the gap between strand 68C and 68D are pivoted into the extended position to form a registration wall for packages on strand 68C. Thus, through selective retraction and extension of the wall segments through an intelligent controller such as a programmable logic controller, the switch conveyor can register packages across the width of the conveyor and individual lanes for delivery to multiple outfeed conveyors at the downstream end of the switch. Selectively retractable wall segments at the left side of each strand in FIGS. 6A and 6B would produce a 1:4 switch.

Although the invention has been described in detail with reference to a few preferred versions, other versions are possible. For example, the switch in FIG. 6 could be made with fewer or more than four strands. Furthermore, the switch could be made of a single wide belt strand with interior wall segments mounted in line in seams between side-by-side belt modules. As another example, the wall segments need not be attached to every belt row. They could be attached on every other row or every third row and so on, so long as the resulting space between consecutive wall segments is small enough not to let conveyed articles pass. As other examples, the belt rollers need not extend through the bottom of the conveyor belt, or they could be mounted on axles parallel to the direction of belt travel. So, as these few examples suggest, the scope of the claims should not be limited to the description of the preferred versions.

What is claimed is:

1. A conveyor comprising:
   a modular conveyor belt constructed of a series of rows of one or more side-by-side belt modules hingedly connected end to end into an endless belt capable of advancing in a direction of belt travel, wherein the rows extend in a lateral direction perpendicular to the direction of belt travel to opposite side edges defining the width of the belt;

a plurality of retractable wall segments attached to and riding with the modular conveyor belt in line with the direction of belt travel and movable from a retracted position at or below the level of articles conveyed on the modular conveyor belt to an extended position providing a wall extending parallel to the direction of belt travel to prevent conveyed articles from moving in the lateral direction past the wall.

2. A conveyor as in claim 1 wherein the modular conveyor belt comprises hinge rods hingedly linking each row of belt modules together and wherein each of the retractable wall segments has a hole receiving an associated hinge rod therethrough for retaining the retractable wall segment and defining an axis about which the retractable wall segment pivots between the retracted and extended positions.

3. A conveyor as in claim 1 further comprising a cam surface below the level of the modular conveyor belt and wherein the retractable wall segments each include a cam follower that causes to retractable wall segment to move to the extended position as the cam follower engages the cam surface while the modular conveyor belt advances in the direction of belt travel.

4. A conveyor as in claim 1 wherein the modular conveyor belt further comprises a plurality of belt rollers arranged in the modular conveyor belt to rotate in a direction not in the direction of belt travel with salient portions of the belt rollers protruding above the modular conveyor belt to support conveyed articles and an engagement surface underlying the modular conveyor belt and wherein the belt rollers protrude below the modular conveyor belt into rolling contact with the engagement surface.

5. A conveyor as in claim 1 comprising a plurality of modular conveyor belts arranged side by side and advancing together in the direction of belt travel.

6. A method of operating a conveyor, the method comprising:
pushing articles conveyed atop belt rollers in a conveyor belt laterally toward a side of the conveyor belt as the conveyor belt advances in a direction of belt travel;
extending wall segments attached to and riding with the conveyor belt in a line in the direction of belt travel to an extended position above the level of the rollers to form a wall of the extended wall segments extending parallel to the direction of belt travel and preventing the articles from moving laterally past the wall;
retracting the wall segments to a retracted position at or below the level of the articles atop the rollers to allow the articles to be moved by the rollers laterally past the line of retracted wall segments.

7. A conveyor as in claim 1 comprising:
a pivot arranged with each of the retractable wall segments for pivoting each retractable wall segment between the retracted position and the extended position; and
means for pivoting the retractable wall segment at the pivot between the retracted and extended positions.

8. A conveyor as in claim 7 wherein the pivot comprises a laterally disposed axle in the modular conveyor belt and wherein the retractable wall segment has a laterally extending bore rotatably mounted on the axle.

9. A conveyor as in claim 8 wherein the modular conveyor belt includes laterally disposed hinge rods hingedly connecting the rows of belt modules and wherein the axle is a hinge rod.

10. A conveyor as in claim 7 wherein the retractable wall segments are disposed at at least one of the sides of the modular conveyor belt.

11. A conveyor as in claim 7 wherein the retractable wall segments are disposed in the interior of the modular conveyor belt.

12. A conveyor as in claim 7 wherein the modular conveyor belt further includes a plurality of belt rollers having salient portions protruding above the conveying surface to support conveyed articles, wherein the belt rollers are arranged to rotate in a direction pushing conveyed articles toward a side of the modular conveyor belt.

13. A conveyor as in claim 12 further comprising an engagement surface underlying the modular conveyor belt and wherein the belt rollers protrude below the modular conveyor belt into rolling contact with the engagement surface.

14. A conveyor as in claim 7 wherein the means for pivoting comprises a spring in each wall segment at the associated pivot biasing the wall segment toward the extended position.

15. A conveyor as in claim 14 further comprising a blocking surface extending along a portion of the modular conveyor belt above the level of the modular conveyor belt in a position to block the retractable wall segments from pivoting into the extended position.

16. A conveyor as in claim 14 further comprising a blocking surface extending along a portion of the modular conveyor belt below the level of the modular conveyor belt and in a position to block the retractable wall segments from pivoting into the extended position.

17. A conveyor as in claim 16 wherein the retractable wall segments include dogs laterally extending from the wall segments into contact with the blocking surface to retain the walls segments in the retracted position.

18. A conveyor as in claim 7 wherein the pivot comprises a laterally disposed axle and wherein the means for pivoting comprises a spring and a cylindrical bearing on the wall segment receiving the axle, wherein the spring resides in the cylindrical bearing.

19. A conveyor as in claim 7 wherein the means for pivoting comprises a cam surface below the level of the modular conveyor belt and a cam follower formed on the retractable wall segment that causes the retractable wall segment to pivot at the pivot to the extended position when the cam follower rides on the cam surface as the belt conveyor advances over the cam surface.

20. A conveyor as in claim 7 wherein the pivot comprises a laterally disposed axle in the modular conveyor belt and wherein the means for pivoting comprises a bearing surface disposed below the level of the modular conveyor belt and a roller formed integrally with the retractable wall segment and having a bore therethrough for receiving the axle, wherein the rotation of the roller riding on the bearing surface pivots the retractable wall segment on the pivot into the extended position.

21. A conveyor as in claim 7 wherein the means for pivoting is selectively movable into and out of contact with the retractable wall segments.

* * * * *